C. DRESSLER.
OVEN SUITABLE FOR USE IN THE MANUFACTURE OF TILES, BRICKS, POTTERY, AND ANALOGOUS WARE, FOR ANNEALING, AND FOR OTHER PURPOSES.
APPLICATION FILED AUG. 6, 1914.

1,170,428.

Patented Feb. 1, 1916.
5 SHEETS—SHEET 1.

C. DRESSLER.
OVEN SUITABLE FOR USE IN THE MANUFACTURE OF TILES, BRICKS, POTTERY, AND ANALOGOUS WARE, FOR ANNEALING, AND FOR OTHER PURPOSES.
APPLICATION FILED AUG. 6, 1914.

1,170,428.

Patented Feb. 1, 1916.

C. DRESSLER.
OVEN SUITABLE FOR USE IN THE MANUFACTURE OF TILES, BRICKS, POTTERY, AND ANALOGOUS WARE, FOR ANNEALING, AND FOR OTHER PURPOSES.
APPLICATION FILED AUG. 6, 1914.
1,170,428.
Patented Feb. 1, 1916.
5 SHEETS—SHEET 3.
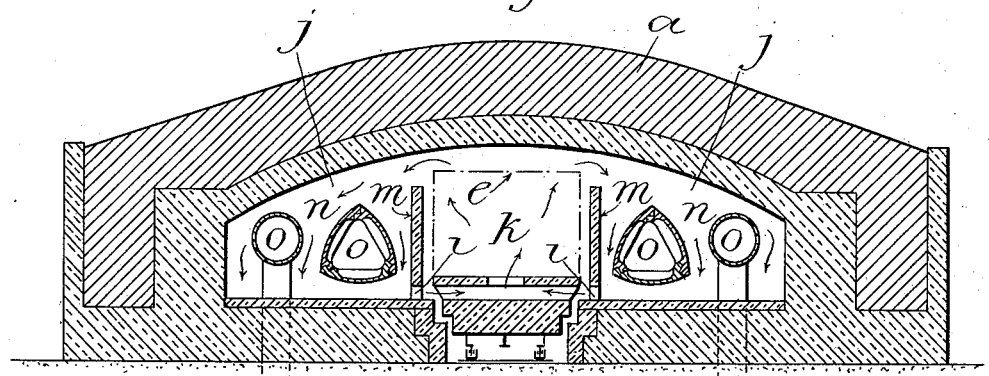
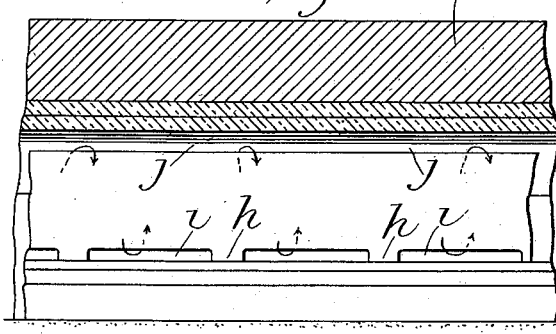
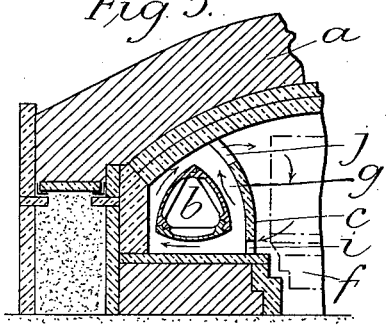
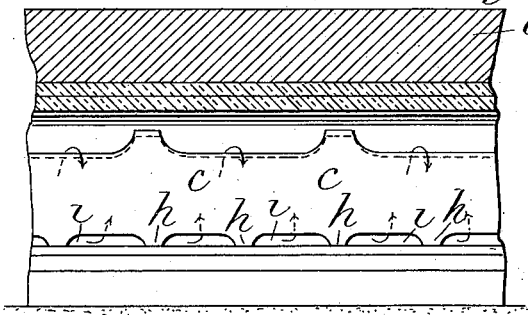
Witnesses.
L. L. Bucket.
E. R. Rosenberg.
Inventor.
Conrad Dressler,
By A. S. Pattison
Atty.

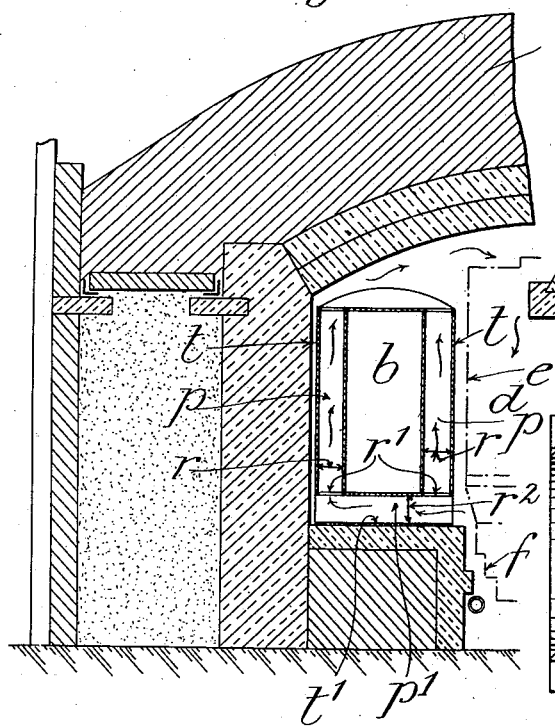
Fig. 12.
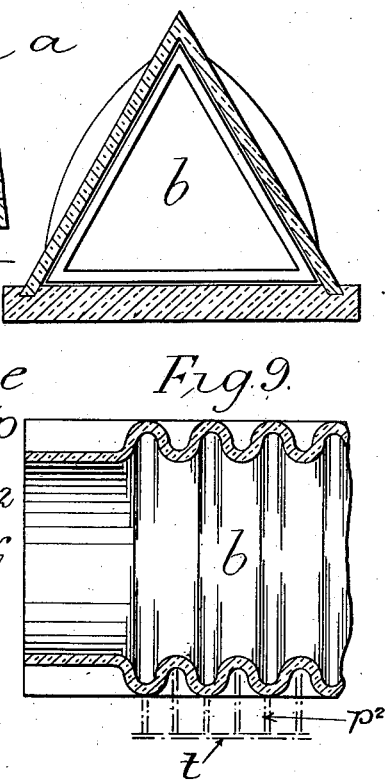
Fig. 8.
Fig. 9.
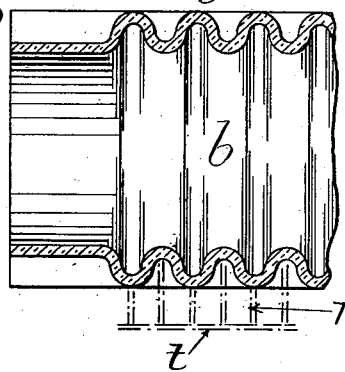

C. DRESSLER.
OVEN SUITABLE FOR USE IN THE MANUFACTURE OF TILES, BRICKS, POTTERY, AND ANALOGOUS WARE, FOR ANNEALING, AND FOR OTHER PURPOSES.
APPLICATION FILED AUG. 6, 1914.
1,170,428.  Patented Feb. 1, 1916.
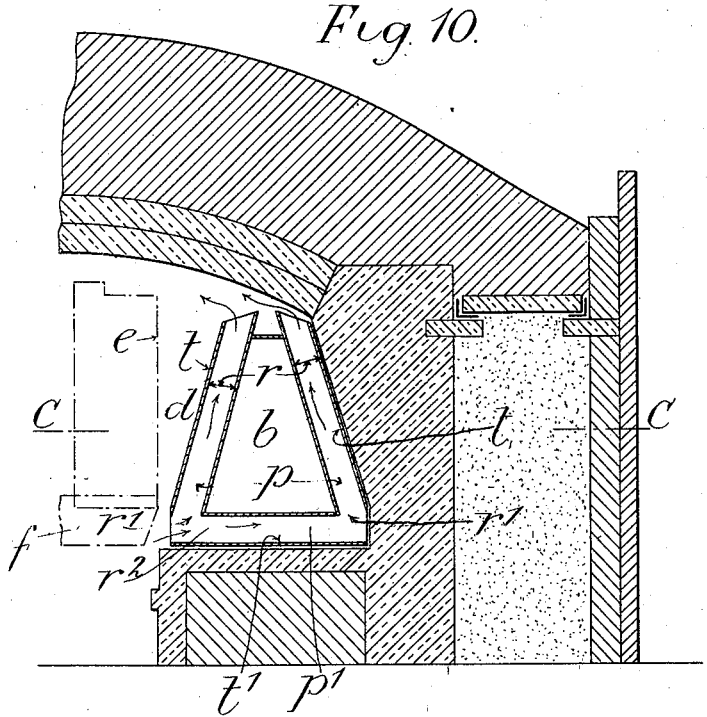
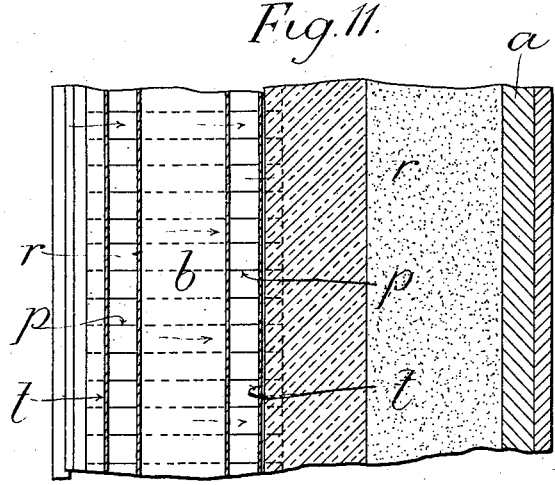

UNITED STATES PATENT OFFICE.

CONRAD DRESSLER, OF CHELSEA, LONDON, ENGLAND.

OVEN SUITABLE FOR USE IN THE MANUFACTURE OF TILES, BRICKS, POTTERY, AND ANALOGOUS WARE, FOR ANNEALING, AND FOR OTHER PURPOSES.

1,170,428.           Specification of Letters Patent.       Patented Feb. 1, 1916.

Application filed August 6, 1914. Serial No. 855,468.

*To all whom it may concern:*

Be it known that I, CONRAD DRESSLER, a a subject of the King of Great Britain and Ireland, residing at Chelsea, in the county of London, England, have invented improvements in or relating to ovens suitable for use in the manufacture of tiles, bricks, pottery, and analogous ware, for annealing, and for other purposes, of which the following is a specification.

This invention has reference to improvements in tunnel and other ovens provided with one or more combustion chambers and flues arranged longitudinally within the heating chamber of the oven in such manner as to heat the air, or air and steam or other gas or vapor (hereinafter included in the term air) in proximity thereto and cause it to rise to the upper part of the oven whence it descends among the goods and again passes into contact with the combustion chamber and flue, or combustion chambers and flues (hereinafter referred to for brevity as the combustion chamber or chambers) and becomes reheated and again ascend so that the air is highly heated and caused to circulate over and among the goods to be heated. Examples of such ovens are described in the specifications of former Letters Patent granted to me, No. 1023628 and applications Serial Numbers 754938 (Patent No. 1,105,243) and 819286.

An object of the present invention is to enable air to be heated by one or more combustion chambers of simple construction and circulated in a better and more effective manner than heretofore usual so that practically the whole height of the oven, or a height corresponding at least to the height of the combustion chamber or chambers can be rendered available for the reception of goods and that the goods can be heated to a high and practically uniform temperature throughout the pile or mass thereof in order that goods at the bottom or center of the pile or mass shall be heated to practically the same temperature as those higher up in the pile or mass or on the outer portions thereof. The invention also has for object to enable the combustion chamber or each combustion chamber, or a portion of the length thereof, to be heated internally to the very high temperatures usually or sometimes required, without liability of its walls collapsing owing to their softening.

The combustion chamber or chambers used may be of any of the kinds described in my said former Patent No. 1023628 and application Serial No. 754938, (Patent No. 1,105,243).

For attaining the first mentioned object, there is arranged between the longitudinal combustion chamber, or it may be group of longitudinal combustion chambers (hereinafter included in the term combusition chamber) and the adjacent space to contain the goods to be heated or dried, a stationary longitudinal wall or screen of refractory material so shaped and arranged at such a distance from the combustion chamber as to form with the adjacent side of the said combustion chamber a separate air heating compartment, passage or zone, or a number of upwardly extending open ended compartments, passages or zones and prevent or retard radiant heat passing from the combustion chamber into the space containing the goods to be heated and to constrain the air adjacent to and heated by the combustion chamber to flow upward to the top of the oven and pass over such wall or screen into the space for goods, then to descend among the goods and then pass under the wall or screen to the bottom of the air heating compartment, passage or zone, or compartments, passages or zones through which it will again rise and be reheated by the combustion chamber. In this way the adjacent upwardly and downwardly flowing portions of the circulating stream of heated air are effectually separated from each other so that practically the whole of the air is constrained to flow more or less quickly in a definite path.

The stationary wall or screen may be vertical or curved, as seen in transverse section, and be carried at the bottom by supports arranged to leave airways between them and having its upper end terminating sufficiently below or away from the upper part of the oven as to form an air-way between the two. Or the top and bottom portions of the wall or screen may be formed with openings for passage of the heated air. The wall or screen may have expansion joints therein.

Usually it will be advantageous to provide a wall or screen such as referred to at each side of the space for goods so as to form at each side of the oven an air heating compartment or zone containing a combustion chamber. In some cases there may be an air heating compartment formed between two stationary longitudinal walls or screens arranged at the central portion of the oven with or without an air heating compartment at each side of the oven.

In the accompanying drawings Figure 1 shows in sectional plan, part of a tunnel oven of the kind herein referred to provided with separate air heating and cooling compartments according to the present invention. Figs. 2 and 3 are cross sections on the lines A A and B B respectively of Fig 1. Fig. 4 is a sectional elevation showing a portion of a longitudinal wall or screen and adjacent parts of the oven. Figs. 5 and 6 are respectively a cross section and sectional elevation showing a modified construction. Fig. 7 is a cross section showing a further modified construction. Figs. 8 and 9 are respectively a cross section and a horizontal section of part of one of the combustion chambers drawn to a larger scale than Figs. 1, 2 and 3. Fig. 10 is a cross section and Fig. 11 a section on the line C C of Fig. 10 showing a modified construction of combustion chamber. Fig. 12 is a similar view to Fig. 10 showing a further modified construction of combustion chamber.

In Figs. 1 and 2, the oven $a$ is provided with a longitudinally arranged combustion chamber $b$ and with a longitudinally arranged vertical wall $c$ arranged between such chamber and the space $d$ in which the goods $e$, carried by a vehicle $f$, are heated. The wall $c$ is arranged at a distance from the combustion chamber $b$ at the corresponding side of the oven so as to form an air heating compartment or zone $g$ separate from the space $d$, the said wall, which is made sufficiently thick for the purpose, also acting as a screen to prevent or retard passage of radiant heat from the combustion chamber $b$ into the space $d$ and to constrain the air adjacent to and heated by the combustion chamber to flow upward and circulate in the manner hereinbefore described for the purpose set forth. In the example now being described, the oven is provided at each side with a separate air heating compartment or zone $g$ in which the corresponding combustion chamber $b$ is so arranged that air can flow under it and upward along each side thereof. Also, each wall $c$ is vertical, of less height than the adjacent part of the oven and carried by supports $h$ (see Fig. 4) so as to leave lower and upper openings $i$ and $j$ respectively for the passage of air to and from the air heating compartment or zone $g$.

Figs. 5 and 6 show a wall or screen $c$ of curved shape extending from the bottom to the top of the air heating compartment $g$ and having lower and upper openings $i$ and $j$ respectively formed therein.

The arrangement of a wall or screen or walls or screens as hereinbefore described, may also advantageously be used in the cooling zone of a tunnel oven constructed according to my former application Serial No. 819286 and British Patent No. 23863/12 in order that the air, steam or other fluid in such cooling zone may flow more uniformly and efficiently through the goods to be cooled and over the cooling chamber or conduit or each cooling chamber or conduit provided in the cooling zone for abstracting heat from the air, steam or other fluid.

Fig. 3 shows the cooling zone $k$ of the oven $a$ thus provided with walls or screens $m$ arranged to form with the adjacent side walls of the oven separate air cooling compartments $n$ through which air or other fluid that has been heated by contact with the hot goods $e$ in the cooling zone can flow in a continuous manner and come into contact with the cooling chambers or conduits $o$ therein through which air or other cooling fluid is caused to flow for abstracting heat from the heated air or other fluid which then again flows into the cooling zone $k$ and into contact with the hot goods therein.

It is desirable that in all cases the combustion chamber $b$, or each combustion chamber $b$, or the cooling chamber or conduit $o$, or each cooling chamber or conduit $o$, should be arranged in its air heating or cooling compartment or zone in such a manner, as shown, as to leave an air way between it and the adjacent side wall of the oven, as in the construction of ovens described in my said former specifications, so that air can flow under and up each side of the combustion chamber or cooling chamber or conduit.

For attaining the hereinbefore secondly mentioned object the refractory walls of the combustion chamber for use in an oven of the kind referred to, are supported or strengthened by rigid outward extensions thereof disposed within the oven and along and over which air will be caused to circulate when the combustion chamber is in use so that such extensions will be maintained at a temperature sufficiently below that of the inner surface of the walls of the chamber as to remain rigid and firmly support such walls even though their inner surfaces may be softened by reason of the high temperature to which they are subjected.

Figure 1:
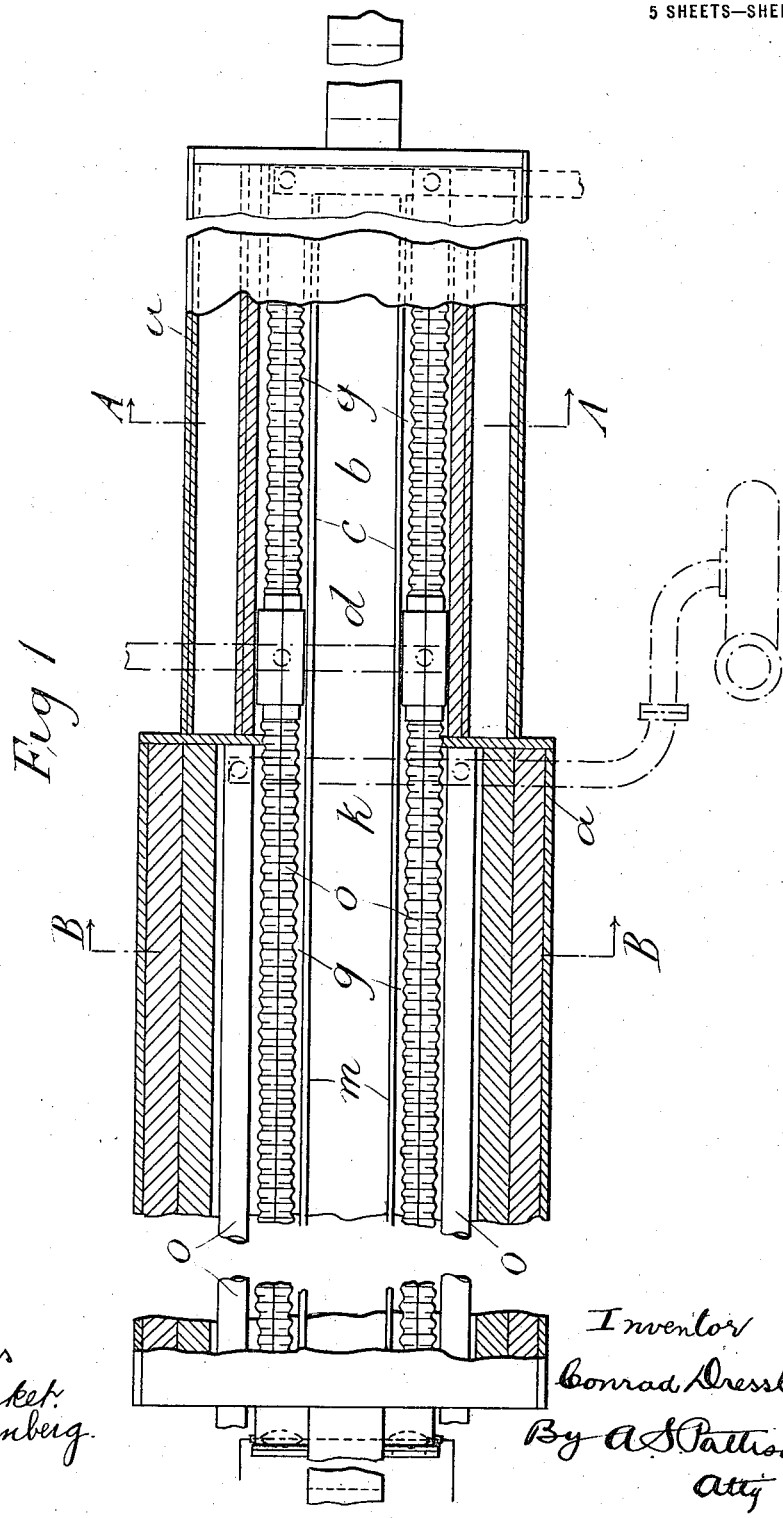
Figure 2:
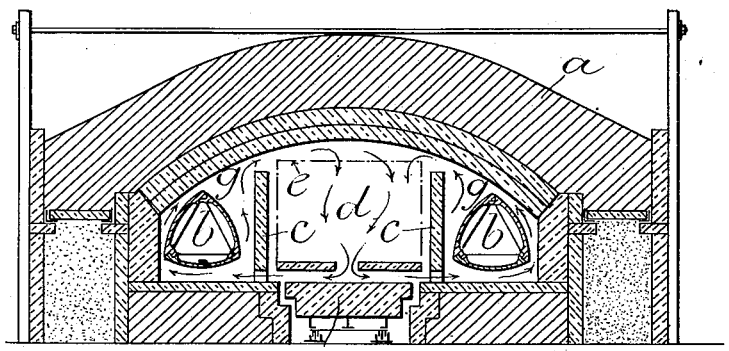
Figure 7:
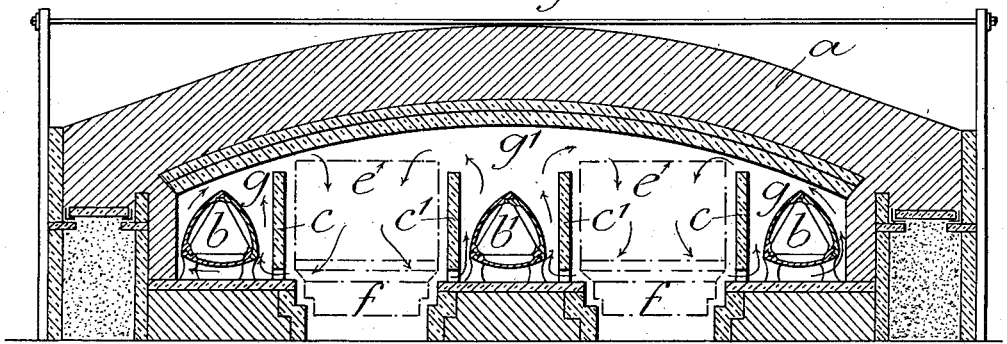
Fig. 7 shows an oven with a centrally arranged air heating compartment $g^1$ formed between two longitudinal walls or screens $c^1$, $c^1$ and containing a combustion chamber $b^1$, the oven being also shown as provided at each side with an air heating compartment $g$ such as shown in Fig. 2.

A combustion chamber with outward extensions as and for the purpose described can be constructed in various forms. The combustion chamber $b$ or each combustion chamber, may, as in the example shown in Figs. 10 and 11, be made of triangular or approximately triangular shape, as seen in transverse section, arranged with the bottom horizontal and the other two sides inclined upwardly. Or, as shown in Fig. 12, the combustion chamber may be made with vertical sides. In each case the longitudinally extending combustion chamber is made of greater height than width. Also, each of the side walls of the chamber is provided externally with a series of outward extensions $p$ in the form of parallel ribs, plates or walls arranged in vertical planes so as to form between them upwardly extending air passages $r$ through which, when the combustion chamber is in use, air will flow as indicated by the arrows, and be heated to a high temperature by contact with the walls of the chamber the outward extensions $p$ of which, owing to their being made of refractory material that is a bad conductor of heat and to the passage of air over their surfaces, will be maintained at a temperature sufficiently below that obtaining within the combustion chamber to enable them to remain rigid and prevent the walls of the combustion chamber collapsing through softening due to great heat. The bottom wall of the combustion chamber may, if desired and as shown, be similarly strengthened by external ribs, plates or walls $p^1$ arranged to form a series of parallel horizontal passages through which air can pass from the central portion $d$ of the oven containing the goods $e$ to the passages $r$ between the lateral ribs, plates or extensions $p$. Or the bottom wall of the combustion chamber may be made sufficiently thick to obviate any liability of its collapsing under the action of heat. The external ribs, plates or extensions $p$ of the side walls of the combustion chamber may, as in the example shown in Figs. 10, 11 and 12, be connected together at their outer edges by a plate or wall $t$ so as to thereby form a series of air passages $r$ open only at the bottom and top so that the circulating air is constrained to flow through them and come into close and effective contact with the walls of the combustion chamber and the outer extension $p$ thereof. The plates or walls $t$ nearest the heating zone $d$ of the oven also serve the same function as the walls or screens $c$ in the oven hereinbefore described with reference to Figs. 1 to 9 inclusive. If the bottom wall of the combustion chambers $b$ shown in Figs. 10, 11 and 12 be provided with outward extensions $p^1$, as shown, they may be similarly connected by a lower plate or wall $t^1$ so as to form a number of open ended box-like passages $r^2$ the interiors of which are in communication with the upwardly inclined air passages $r$ at the outer side walls of the combustion chamber. The air passages $r$ may have their air inlet openings $r^1$ above the lower box-like passages $r^2$ as shown.

The side walls of the combustion chamber $b$, or each combustion chamber $b$, may, as shown in the construction of oven hereinbefore described with reference to Figs. 1 to 9 inclusive, be made of corrugated or equivalent shape for the purpose of strengthening them and producing a large heating surface. In this case the parallel ribs, plates or extensions may be connected to and project outwardly from the outwardly on inwardly extending ridges of the corrugated surface, or from both ridges as indicated in dotted lines at $p^2$ in Fig. 9. The lower wall of the combustion chamber may also be of corrugated shape if desired and be similarly strengthened.

The walls of combustion chambers constructed as described can be made in sections suitably adapted to be jointed together to form the complete chamber, the sections being made for example by forcing the refractory material of which they are made through suitably shaped dies, or by molding them in a press or by casting them in molds.

The invention is applicable to intermittent ovens and driers as well as to continuous tunnel ovens and driers.

What I claim is:—

1. In an oven, a wall arranged longitudinally therein at one side of the space designed to contain the goods to be treated and so as to allow of the fluid medium within the said space flowing under and over its lower and upper ends and a chamber or conduit arranged longitudinally between said wall and the adjacent side wall of the oven and through which fluid at a different temperature to that in the oven can be caused to flow for changing the temperature of the fluid flowing in contact with said chamber or conduit.

2. In an oven, a combustion chamber arranged longitudinally therein at one side of the space designed to contain the goods to be treated and a longitudinally arranged wall of refractory material adapted to form with the chamber a separate air heating compartment, passage or zone and prevent or retard the passage of radiant heat from said combustion chamber to said space and to constrain the air heated by the combustion chamber to flow upward through the heating compartment, passage or zone and downward through the said space for goods.

3. In an oven, a combustion chamber arranged longitudinally therein at one side of the space designed to contain the goods to be treated and provided with external ribs or extensions for the purpose set forth.

4. In an oven, a combustion chamber arranged longitudinally therein at one side of the space designed to contain the goods to be treated and provided with external ribs or extensions and a longitudinally arranged wall of refractory material adapted to form with the chamber a separate air heating compartment or zone and prevent or retard the passage of radiant heat from said combustion chamber to said space and to constrain the air heated by the combustion chamber to flow upward through the heating compartment or zone and downward through the said space for goods.

5. In an oven, a wall of refractory material arranged longitudinally therein at one side of the space designed to contain the goods to be treated and so as to allow of air flowing under and over its lower and upper ends and a longitudinally arranged combustion chamber disposed between said wall and the adjacent side wall of the oven for the purposes set forth.

6. In an oven, a wall of refractory material arranged longitudinally therein at one side of the space designed to contain the goods to be treated and so as to allow of air flowing under and over its lower and upper ends and a longitudinally arranged combustion chamber disposed between said wall and the adjacent side wall of the oven and so that air can flow under it and between it and the said longitudinal wall and the side wall of the oven.

7. In an oven, a longitudinally arranged wall at one side of the space designed to contain the goods to be heated, a longitudinally arranged combustion chamber between said wall and the side wall of the oven and a number of upwardly extending air passages arranged between the combustion chamber and the said longitudinal wall and side wall and in communication at the upper and lower ends with the said space.

8. In an oven, a wall of refractory material arranged longitudinally therein at one side of the space in the oven designed to contain the goods to be heated and forming with the adjacent side wall of the oven a heating compartment that communicates at top and bottom with said space and a combustion chamber supported therein above the bottom thereof so that air can flow through said compartment under and around the combustion chamber therein and transversely arranged vertical partitions between said chamber and walls forming therewith vertical passages open at top and bottom.

9. In an oven, a combustion chamber arranged longitudinally at each side of the space designed to contain the goods to be heated and provided with a number of external vertically arranged ribs or extensions for the purpose set forth.

10. In an oven, a combustion chamber arranged longitudinally therein at one side of the space designed to contain the goods to be heated and provided at one side with vertically arranged ribs or extensions and a longitudinally arranged wall connected to the ribs on said chamber and forming therewith a number of upwardly extending air passages that are in communication at their upper and lower ends only with the said space for the purpose specified.

11. In an oven, a combustion chamber arranged longitudinally therein at one side of the space designed to contain the goods to be heated and provided at both sides with vertically arranged external ribs or extensions and longitudinally arranged walls connected to the said ribs or extensions so as to form therewith at the two sides of the chamber a number of upwardly extending air passages that are in communication at their upper and lower ends only with the said space.

12. In an oven, a combustion chamber arranged longitudinally therein at one side of the space designed to contain the goods to be heated and provided at both sides with vertically arranged external ribs or extensions and at its lower side with downwardly extending ribs or extensions and longitudinally arranged walls connected to said ribs or extensions so as to form at each side of the combustion chamber a number of upwardly extending air passages and below the chamber a number of horizontal air passages, all the passages being in communication at one end with the lower portion of the said space and the upwardly extending passages being in communication at their upper ends with the upper portion of the said space.

13. In a tunnel oven, a wall arranged longitudinally at one side of the cooling zone of the oven and so as to allow of air heated by the goods in said cooling zone flowing over and under the upper and lower sides of said wall and one or more cooling conduits arranged in the compartment formed between said wall and the adjacent side wall of the oven.

14. In a tunnel oven, longitudinal walls arranged at each side of the heating zone and cooling zone of the oven and arranged to allow of air circulating in a direction transverse to the length of the oven through the said heating and cooling zones and the compartments formed between said walls and the adjacent side walls of the oven, combustion chambers arranged longitudinally within the compartments at the opposite sides of the heating zone and cooling conduits arranged longitudinally within the compartments at opposite sides of the cooling zone.

15. In an oven a longitudinally extending combustion chamber made of refractory material and of greater height than width and having double side walls with a series of parallel upwardly extending ribs between said walls and integral therewith, and forming between them a number of upwardly extending passages open at top and bottom.

16. In an oven a longitudinally extending combustion chamber made of refractory material and of greater height than width and having double side and bottom walls with upwardly extending parallel ribs between the double side walls and horizontally extending ribs between the double bottom walls said ribs and walls forming between them parallel and connected horizontal and upwardly extending passages open at the top and bottom.

Signed at London, England, this 24 day of July, 1914.

CONRAD DRESSLER.

Witnesses:
H. D. JAMESON,
O. J. WORTH.